(12) United States Patent
Birru et al.

(10) Patent No.: US 9,832,831 B2
(45) Date of Patent: Nov. 28, 2017

(54) ELECTRIC LIGHT AND DAYLIGHT CONTROL SYSTEM WITH A DUAL-MODE LIGHT SENSOR

(75) Inventors: Dagnachew Birru, Yorktown Heights, NY (US); Eduard Johannes Meijer, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 40 days.

(21) Appl. No.: 14/112,259

(22) PCT Filed: Apr. 20, 2012

(86) PCT No.: PCT/IB2012/051994
§ 371 (c)(1),
(2), (4) Date: Oct. 17, 2013

(87) PCT Pub. No.: WO2012/143900
PCT Pub. Date: Oct. 26, 2012

(65) Prior Publication Data
US 2014/0225512 A1 Aug. 14, 2014

Related U.S. Application Data

(60) Provisional application No. 61/477,632, filed on Apr. 21, 2011.

(51) Int. Cl.
*H05B 33/08* (2006.01)
*E06B 9/32* (2006.01)
(Continued)

(52) U.S. Cl.
CPC .......... *H05B 33/0854* (2013.01); *E06B 9/32* (2013.01); *E06B 9/68* (2013.01); *H05B 37/0218* (2013.01);
(Continued)

(58) Field of Classification Search
CPC .. H05B 33/08; H05B 33/0854; H05B 33/086; H05B 33/0872; H05B 33/0869;
(Continued)

(56) References Cited

U.S. PATENT DOCUMENTS 5,237,169 A * 8/1993 Grehant ................. 250/214 AL
5,648,656 A * 7/1997 Begemann et al. ... 250/214 AL
(Continued)

FOREIGN PATENT DOCUMENTS

EP 1245135 B1 9/2003
JP 63124301 A 5/1988
(Continued)

OTHER PUBLICATIONS

Brooks N S H ED et al., "Multi-Variable Optimisation within an Art Gallery Lighting Controller", Circuits and Systems, 1990., Proceedings of the 33rd Midwest Symposium on Calgary, Alta., Canada Aug. 12-14, 1990, New York, NY, USA,IEEE, US, Aug. 12, 1990 (Aug. 12, 1990), pp. 677-680, XP010047928.

*Primary Examiner* — Jimmy Vu
*Assistant Examiner* — Henry Luong (57) ABSTRACT

An electric light and external light control system for a space with a dual-mode light sensor is proposed. The dual-mode light sensor (106) measures and computes the amount of external light and electrical light incident on its sensing surface. The individual measured light components (total light, electric light and external light) are transmitted to the window treatment controller (103) and the electric light controller (102). The controllers (102, 103) use this information to optimally control the lighting condition to meet user requirements and reduce energy consumption. Both controllers (102, 103) operate concurrently and independently, but are linked via the dual-mode sensor (106).

13 Claims, 6 Drawing Sheets

(51) Int. Cl.
*E06B 9/68* (2006.01)
*H05B 37/02* (2006.01)

(52) U.S. Cl.
CPC .. *H05B 37/0245* (2013.01); *E06B 2009/6827* (2013.01); *Y02B 20/46* (2013.01); *Y02B 80/50* (2013.01)

(58) Field of Classification Search
CPC .. H05B 39/041; H05B 39/042; H05B 39/083; H05B 41/38; H05B 37/0218; Y02B 80/50; Y02B 20/46
USPC ................. 315/151, 158, 291, 308; 700/2
See application file for complete search history.

(56) References Cited

U.S. PATENT DOCUMENTS

| | | | |
|---|---|---|---|
| 5,663,621 A * | 9/1997 | Popat | G05D 25/02 160/166.1 |
| 6,084,231 A | 7/2000 | Popat | |
| 6,831,288 B1 | 12/2004 | Schmitt | |
| 6,965,813 B2 * | 11/2005 | Granqvist et al. | 700/276 |
| 7,085,627 B2 | 8/2006 | Bamberger | |
| 7,111,952 B2 | 9/2006 | Veskovic | |
| 7,941,245 B1 * | 5/2011 | Popat | E06B 9/68 135/155 |
| 2005/0110416 A1 * | 5/2005 | Veskovic | E06B 9/32 315/149 |
| 2006/0091822 A1 * | 5/2006 | Bierman | H05B 37/0218 315/244 |
| 2006/0170376 A1 * | 8/2006 | Piepgras | E06B 3/6722 315/295 |
| 2006/0207730 A1 * | 9/2006 | Berman | E06B 9/32 160/310 |
| 2008/0183316 A1 * | 7/2008 | Clayton | G05B 19/042 700/90 |
| 2008/0183337 A1 * | 7/2008 | Szabados | H05B 37/0281 700/296 |
| 2008/0185969 A1 * | 8/2008 | Vegter | H05B 37/02 315/158 |
| 2009/0222137 A1 * | 9/2009 | Berman et al. | 700/275 |
| 2010/0071856 A1 | 3/2010 | Zaharchuk | |
| 2010/0148677 A1 * | 6/2010 | Melanson | 315/154 |
| 2011/0029136 A1 | 2/2011 | Altonen | |
| 2011/0164304 A1 * | 7/2011 | Brown et al. | 359/275 |

FOREIGN PATENT DOCUMENTS

| | | |
|---|---|---|
| JP | 2001345186 A | 12/2001 |
| JP | 2004185073 A | 2/2004 |
| JP | 2005115765 A | 4/2005 |
| JP | 2006210045 A | 8/2006 |
| JP | 2007524958 A | 8/2007 |
| JP | 2010503947 A | 2/2010 |
| WO | WO0137616 A1 | 5/2001 |
| WO | WO2010111250 A1 | 9/2010 |

\* cited by examiner

ELECTRIC LIGHT AND DAYLIGHT CONTROL SYSTEM WITH A DUAL-MODE LIGHT SENSOR

This invention relates to lighting controls and, more particularly, to a method and a system for controlling light luminosity in a space including an installed light source and an external light source.

Current building control systems for controlling electric light and daylight mostly use independent manual control systems. Recently, advanced systems have been introduced in the market that utilize daylight sensors to control electric lights according to the amount of daylight entering the space. These systems use a gross light level measurement to control the dimming level of the electric light. Motorized blinds have also been introduced to control the amount of daylight entering the space. These advanced subsystems (daylight through windows and electrical lights) still operate independently of each other. Such systems operating independently but affecting the same variable, i.e. light in the room, are not only inefficient in terms of energy savings but also can lead to user dissatisfactions. Research has shown that when the occupants are not satisfied with automatic controls, they often revert to manual controls, defeating the purpose of automatic controls and resulting in diminished benefits, such as energy savings. The use of integrated controls, however, can lead to further energy savings and can also reduce such user dissatisfaction.

Recently, integrated control systems have been disclosed in some US patents. The following are two examples.

U.S. Pat. No. 7,085,627 B2 discloses a combined control of window blinds and electrical lights. This system is based on a central controller, but it does not make use of daylight sensors to adjust the lighting level. It is a manually controlled system. Though the controller is depicted as a combined controller, the control of the window treatments and the lights are essentially done manually and independently.

U.S. Pat. No. 7,111,952 B2 discloses a combined controller for window treatments and electric lights. This system includes daylight sensing to control the dimming levels of the electric lights and the amount daylight in the room. This system uses a central controller to control the subsystems. However, the operation is sequential, i.e., first window treatments are adjusted until fully opened/closed, and then electric lights are adjusted to provide the remaining required light.

One common shortcoming of the above inventions is that they operate sequentially, e.g., first the window blinds are closed/opened fully, then followed by the operation of the electric lights. Such a system has the potential to dissatisfy the users. For example, when users change the setpoints or an occupancy sensor detects a changing environment and settings need to be changed (such as from OFF to ON position), users will have to wait until the sequential operation is completed to see if the lighting preferences are met. Since window treatments operate slowly, the overall waiting time can be several seconds long, if not a minute or more. With today's need for fast responses, users may not tolerate such a long waiting time and will eventually revert to fully manual controls.

In addition, the integrated control system mentioned above uses a central controller to control both windows treatments and electric lights, requiring communications between the subsystems.

An alternative approach is to share the total measured light luminosity with both the window treatment system and the electric light system, so that both systems try to independently meet the lighting set point requirement. Such a system has two completely independent closed loop feedback control systems that operate on a single outcome, i.e. the total light level in a room. However, such a system has some inherent problems and does not guarantee an optimal operation for energy saving and providing the necessary daylight to users. The main problem is caused by two independent control loops with different time constraints 'fighting' against each other to satisfy the setpoint requirement. Due to this problem, wide deployment of these strategies is limited, albeit also at the expense of user dissatisfaction and reduced energy savings.

This disclosure provides independent closed loop controls, yet the operation of the control loops is linked via measured lighting components, such that the above problems may be reduced or overcome.

This disclosure describes a system to control external light (e.g., daylight or sunlight) and electric light in a space such that both electric lights and window treatments (e.g., blinds, shades, etc.) operate in parallel (not sequentially), without the need to communicate with each other, and at the same time reduce energy consumption and meet user setpoint requirements. Their operation is linked via the knowledge of the external light and electric light components in a space, measured by a dual-mode light sensor. Examples of a dual-mode light sensor includes spectral light sensors, coded light and other measurement systems that can identify the external light component and the electric light component in a space. A few examples of the sensing schemes are described later below.

Certain embodiments herein include a system to control both electric light and external light using light sensors or measurement and estimation techniques that can produce external light and electric light components in a space. The following are some example features:

The system measures the interior and exterior lighting conditions through sensors and using measurement results adjusts the window treatments and electric lights.

The interior light sensor transmits the individual measured light values (e.g. external light, electric light and total light components) to both the electric light controller and the window treatment controller.

The window treatment controller and the electric light controller use the sensor information to adjust the optimal lighting conditions in the space.

The window treatment controller and the electric light controllers are linked via the dual-mode interior light sensor or the measurement system to produce lighting components. Thus, no direct link between the electric light and the window treatment is necessary for optimal operation.

The system controls the lighting condition in such a way that users' lighting setpoints and energy consumption goals are met.

Other sensors, such as temperature and occupancy sensors can also be integrated into the system.

Additional features such as glare controls can also be integrated into the system.

The system can also be linked to a real-time weather forecast database to improve the performance of the system.

In one embodiment, the invention relates to a method of controlling light luminosity in a space including an installed light source and an external light source. The method includes: measuring individual light intensity components from the light sources at a location within the space, controlling the intensity level of the installed light source and the amount of light from the external light source entering the space based on the measured light intensities, and tuning the intensity level of the installed light source and the amount of external light entering the space simultaneously to optimize the conditions that the combined light intensity measured from said light sources is closest to a pre-defined target luminance level at the location, and the amount of energy consumed by the installed light source is minimized.

In another embodiment, the invention relates to a system for controlling light luminosity in a space including an installed light source and an external light source. The system includes: a sensor for measuring individual light intensity components from the light sources at a location within the space, a first controller for controlling the intensity level of the installed light source and a second controller for controlling the amount of light from the external light source entering the space based on the measured light intensities, wherein the controllers are adapted to tune the intensity level of the installed light source and the amount of external light entering the space simultaneously to optimize the conditions that the combined light intensity measured from said light sources is closest to a pre-defined target luminance level at said location, and the amount of energy consumed by the installed light source is minimized.

In another embodiment, the invention relates to a non-transitory computer readable medium having stored thereon instructions for causing a processor to perform a process of controlling light luminosity in a space including an installed light source and an external light source. The process includes: measuring individual light intensity components from the light sources at a location within the space, controlling the intensity level of the installed light source and the amount of light from the external light source entering the space based on the measured light intensities, and tuning the intensity level of the installed light source and the amount of external light entering the space simultaneously to optimize the conditions that the combined light intensity measured from said light sources is closest to a pre-defined target luminance level at said location, and the amount of energy consumed by the installed light source is minimized.

In general the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

In one embodiment, the control system is derived in an analytical manner. The main objective is to minimize a cost function composed of lighting setpoint error and energy consumption.

Figure 1:
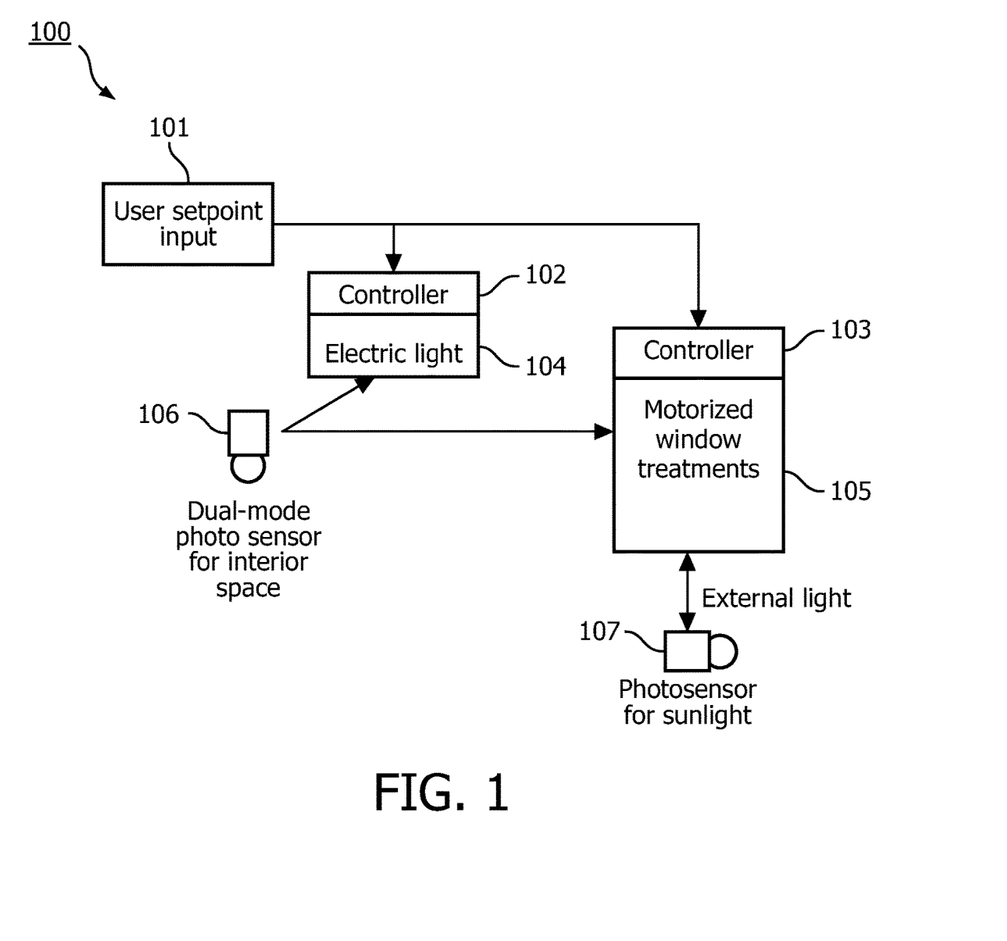
FIG. 1 shows a high level diagram of a lighting control system according to an embodiment of the invention.

FIG. 1 shows an embodiment of the implementation described herein. The system 100 includes both a window treatment 105 and an electric light 104 having their own controllers 103 and 102, respectively. User input 101 (User setpoint input) and sensor data from the sensor 106 are shared with both systems. The interior light sensor 106 is one that can decompose the total measured light intensity value into an external light component and an electric light component. The system may include a photosensor 107 for measuring the external light (e.g., sunlight) intensity.

The window treatment controller 103 uses the information from the sensor 106 and optionally sensor 107 to adjust the amount of external light admitted through the window into the space in such a way that the user's requirement (setpoint) is satisfied and the energy consumption is minimized. The electric light controller 102 also performs similar functions. Preferably, both the electric light controller 102 and the window treatment controller 103 operate at the same time in parallel, without the need to communicate with each other.

Note that the number of light fixtures and window blinds will depend on the particular application. The communication between user inputs, window treatments and electric lights can occur through a local dedicated connection (wired or wireless) or through a backbone network, such as the enterprise network for data and/or building controls.

Figure 2:
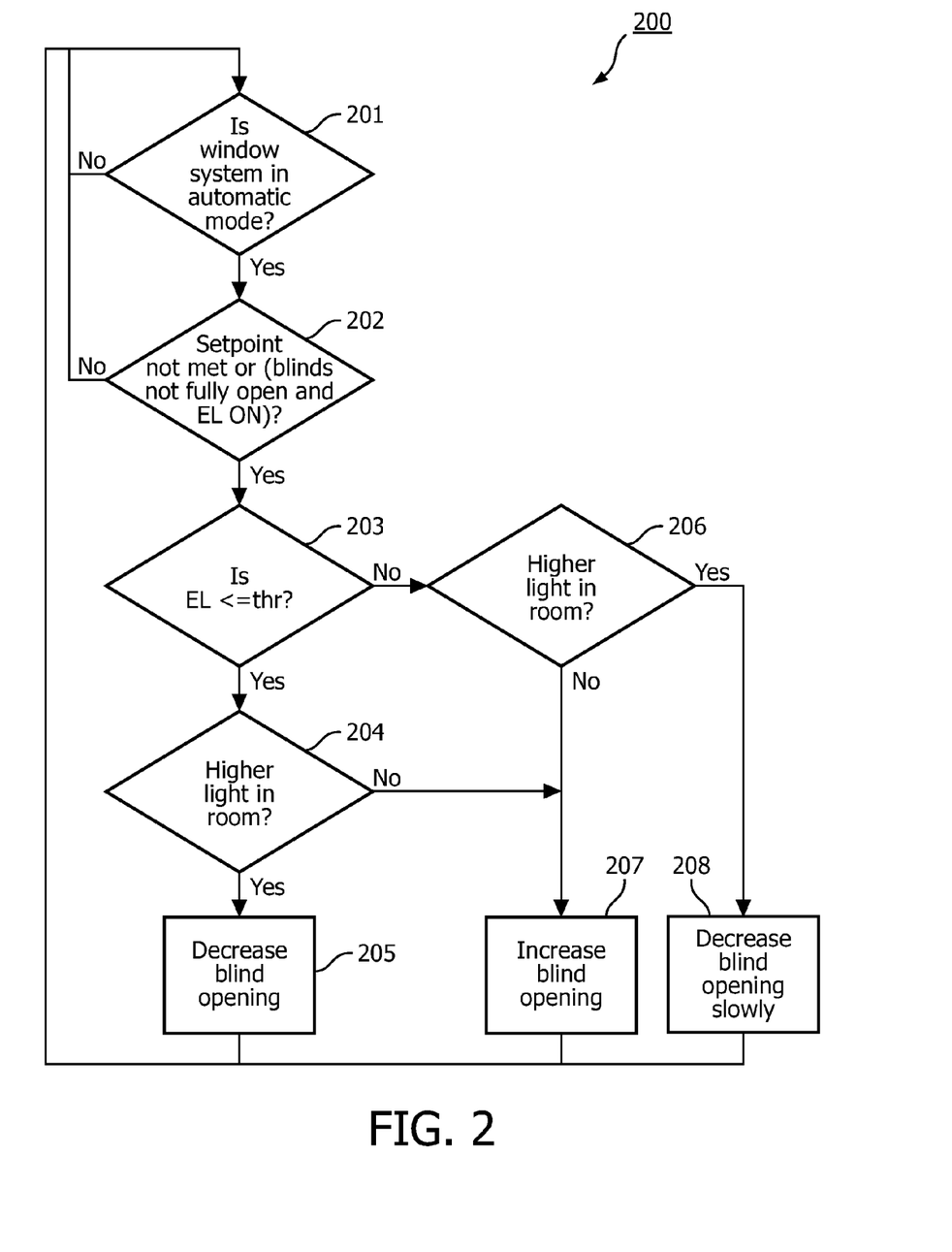
FIG. 2 shows a flow chart of a window treatment (blinds) controller operation according to an embodiment of the invention.
Figure 3:
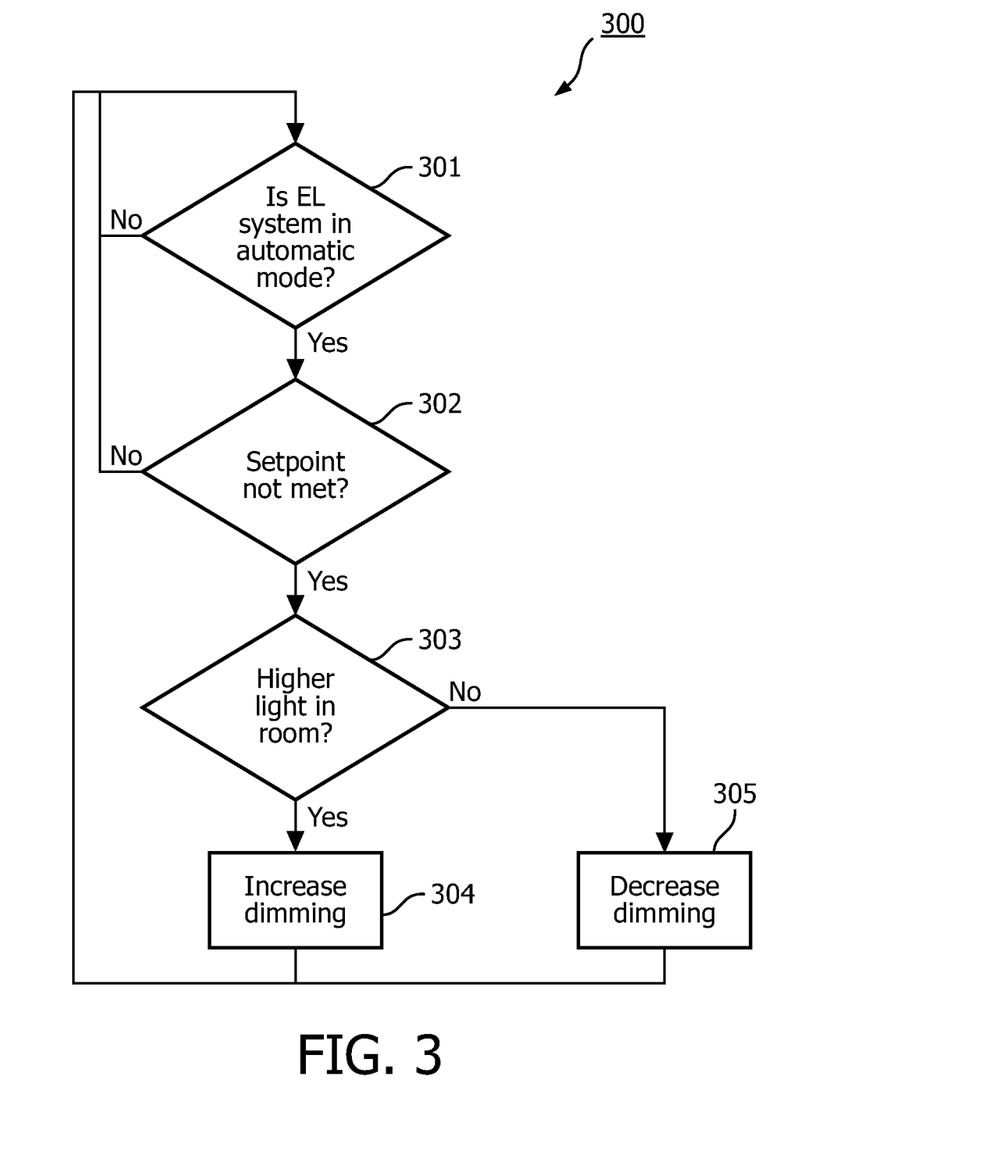
FIG. 3 shows a flow chart of an electric light controller operation according to an embodiment of the invention.

FIGS. 2 and 3 show simplified flow charts of the operation of a control system according to an embodiment described herein. FIG. 2 shows flow chart 200 for the operation of the window treatment controller, and FIG. 3 shows flow chart 300 for the electric light controller in the case where the window treatment controller receives both the daylight and electric light (EL) components of the interior space. Its mode of operation is changed based on the amount of the electric light component in the space (EL<threshold). In this case, the electric light operates as a standard daylight harvesting controller. For example, a daylight harvesting system using a light level sensor, a photosensor, to detect the prevailing light level, luminance or brightness, in open-loop or closed-loop systems. In an open-loop system, the photosensor detects the amount of available daylight only and can be positioned on the building's exterior wall or roof, or inside the building facing the window or skylight. In a closed-loop system, the photosensor detects the total photometric amount of light from both daylight and electric sources in the space. For example, in an office a closed-loop photosensor can be positioned on the ceiling facing the desktops in order to detect the amount of light on the work surface.

Referring to FIG. 2, in step 201a determination is made whether the window treatment system is in an automatic mode. For ease of illustration, the window treatments used in this example are window blinds. If yes, then in step 202 a determination is made whether the setpoint is met or whether the blinds are not fully opened and the EL is turned on. If yes, in step 203 a determination is made whether the EL intensity is less than or equal to a threshold value. If yes, in step 204 a determination is made whether light in the space is higher than necessary. If yes, in step 205 the window treatment controller decreases the blind opening to allow less external light enter into the space.

If the determination in step 203 is no, then in step 206 a determination is made whether light in the space is higher than necessary. If yes, in step 208 the window treatment controller decreases the blind opening slowly.

If the determination in step 204 or step 206 is no, then in step 207 the window treatment controller increases the blind opening to allow more external light enter into the space. Note that reference to "daylight" does not limit the light exterior to the space as sunlight or daylight. Also the reference to "blinds" does not limit the window treatments to window blinds.

Referring to FIG. 3, in step 301a determination is made whether the electric light system is in an automatic mode. If yes, then in step 302 a determination is made whether the setpoint is met. If yes, in step 303 a determination is made whether light in the room is higher than necessary. If yes, in step 304 the electric light controller increases the dimming of the electric light. If no, in step 305 the electric light controller decreases the dimming of the electric light.

In an embodiment, the following control algorithm may be used for implementing the simultaneous control of the electric light and external light components.

Control Algorithm Derivation

In one embodiment, the approach is to use adaptive controllers that are based on a gradient decent algorithm to minimize a cost function. Other options include traditional controllers such as PI, PID, etc. Below, the first option is described to illustrate the basic theoretical foundation for the system described above.

One general scheme is to operate both window treatments and electric lights in such a way that both of them attempt to reduce the lighting error and energy consumption in the space. Such an objective leads to the following adaptive system:

$$x(n) = x(n-1) - \mu_1 \frac{\partial \|e(n)\|^2}{\partial x} - \mu_2 \frac{\partial \|E(n)\|^2}{\partial x}$$

$$w(n) = w(n-1) - \mu_3 \frac{\partial \|e(n)\|^2}{\partial w} - \mu_4 \frac{\partial \|E(n)\|^2}{\partial w}$$

where x and w are the variables being adapted, representing electric light and window treatment respectively, e is the lighting error, i.e., the difference between user set point and measured light level, E is proportional to energy consumption, and μ's are small positive constants (adaptation step sizes). The last two terms are the amount by which the electric lights and window treatments will be adjusted for each adaptive control cycle. Here, n is a cycle indicator.

The lighting error term e can further be described as $$e(n)=y(n)-u$$

where u is the desired user set point, y(n) is the interior light sensor reading. The interior light can be described as $$y(n)=dl(n)*w(n)+x(n)$$

where dl is the available external light (e.g., daylight) level. Similarly, making use of the above relationships, the energy consumption of the electric lights can be described as $$E(n) \propto x(n)$$

$$\propto y(n)-dl(n)*w(n)$$

Using the above relationships and after further simplifications, the closed loop control systems can be described by $$x(n)=x(n-1)-\mu_1 e(n)-\mu_2 x(n)$$

$$w(n)=w(n-1)-\mu_3 e(n)dl(n)+\mu_4 x(n)$$

As seen from the above equations, the presence of the same e(n) and x(n) in both equations illustrates the interaction between the external light and electric light outputs.

The above general system attempts to find a good balance between reduced energy consumption and meeting user setpoints. This means that sometimes user setpoints may not be met fully in order to save energy. This can occur in cases where there is no sufficient external light to meet the requirements, and the electric light intensity would need to be increased substantially, which may not meet energy requirements.

An alternative arrangement is one that is based on meeting user setpoint, but still reduces energy consumption. Such a system can be obtained by modifying the adaptive equations as $$x(n) = x(n-1) - \mu_1 \frac{\partial \|e(n)\|^2}{\partial x}$$

$$w(n) = w(n-1) - \mu_3 \frac{\partial \|e(n)\|^2}{\partial w} - \mu_4 \frac{\partial \|E(n)\|^2}{\partial w}$$

Further simplification results in the following adaptive system $$x(n)=x(n-1)-\mu_1 e(n)$$

$$w(n)=w(n-1)-\mu_3 e(n)dl(n)+\mu_4 x(n)$$

With this system, the lighting controller simply attempts to meet user setpoint (i.e. reduced lighting error). However, the window treatment system attempts to do both, i.e. meet user setpoints and 'force' the electric light to save energy. The window treatment system does this by admitting as much external light as possible, so that the electric lights will dim accordingly.

Figure 4:
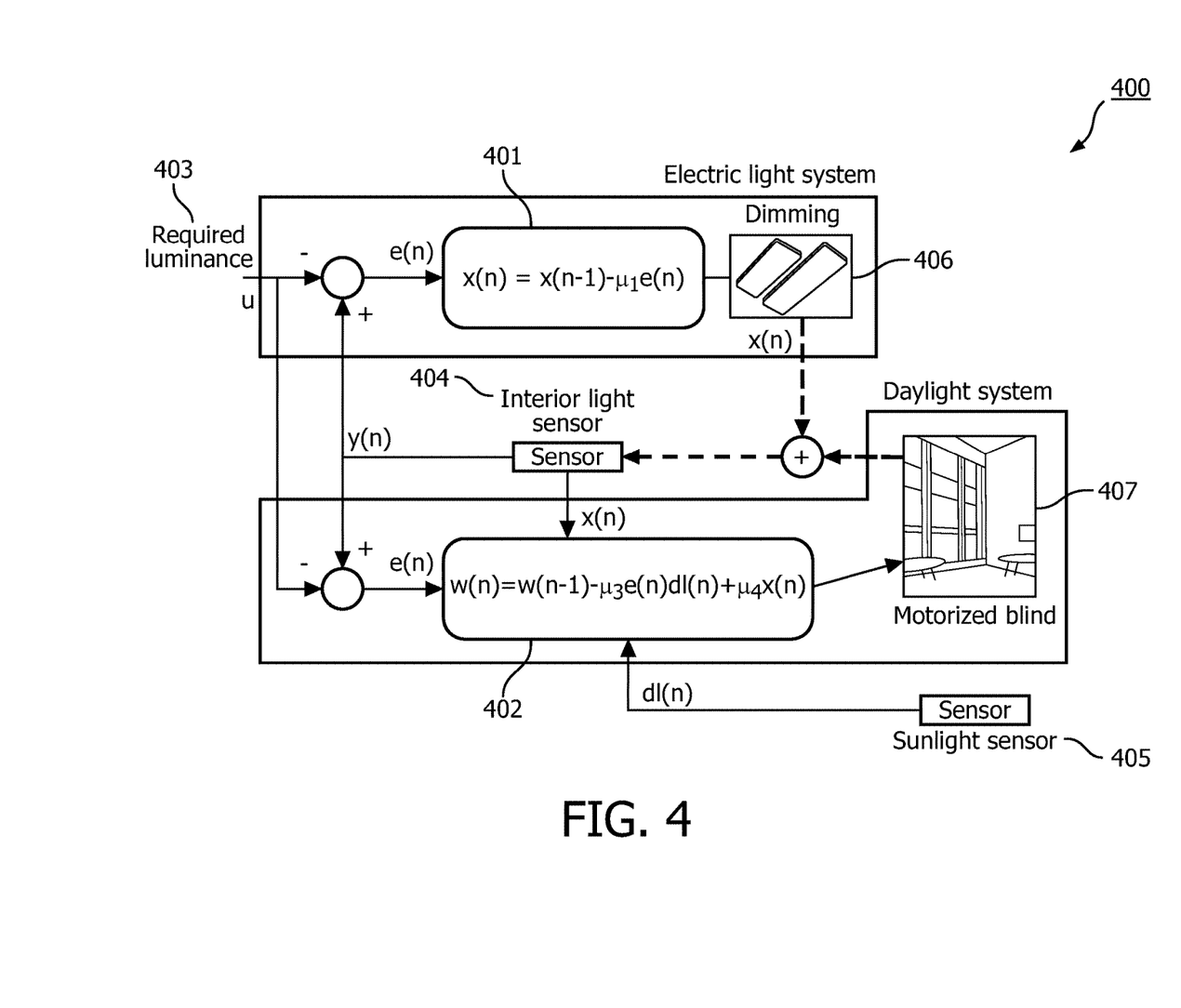
FIG. 4 shows a high level diagram of a lighting control system according to another embodiment of the invention.

FIG. 4 shows simplified block diagrams 400 of one embodiment of the implementation of this approach. The system attempts to meet the required luminance level 403. The interior light sensor 404 measures the total light, y(n,) and the electric light component, x(n). The external light sensor 405 measures the external light component dl(n). The total light data is transmitted to the electric light controller 401 for controlling the dimming level of the electric lights 406. Data on both the external light and the electric light components are transmitted to the window treatment controller 402, which controls the motorized window treatments (e.g., blinds) 407.

Sensing Scheme

The dual-mode interior sensor system could be designed in a number of ways. The following are brief descriptions of these sensing schemes. These schemes provide different performance/complexity tradeoffs. The disclosed system is not limited to using these sensing schemes.

Figure 5:
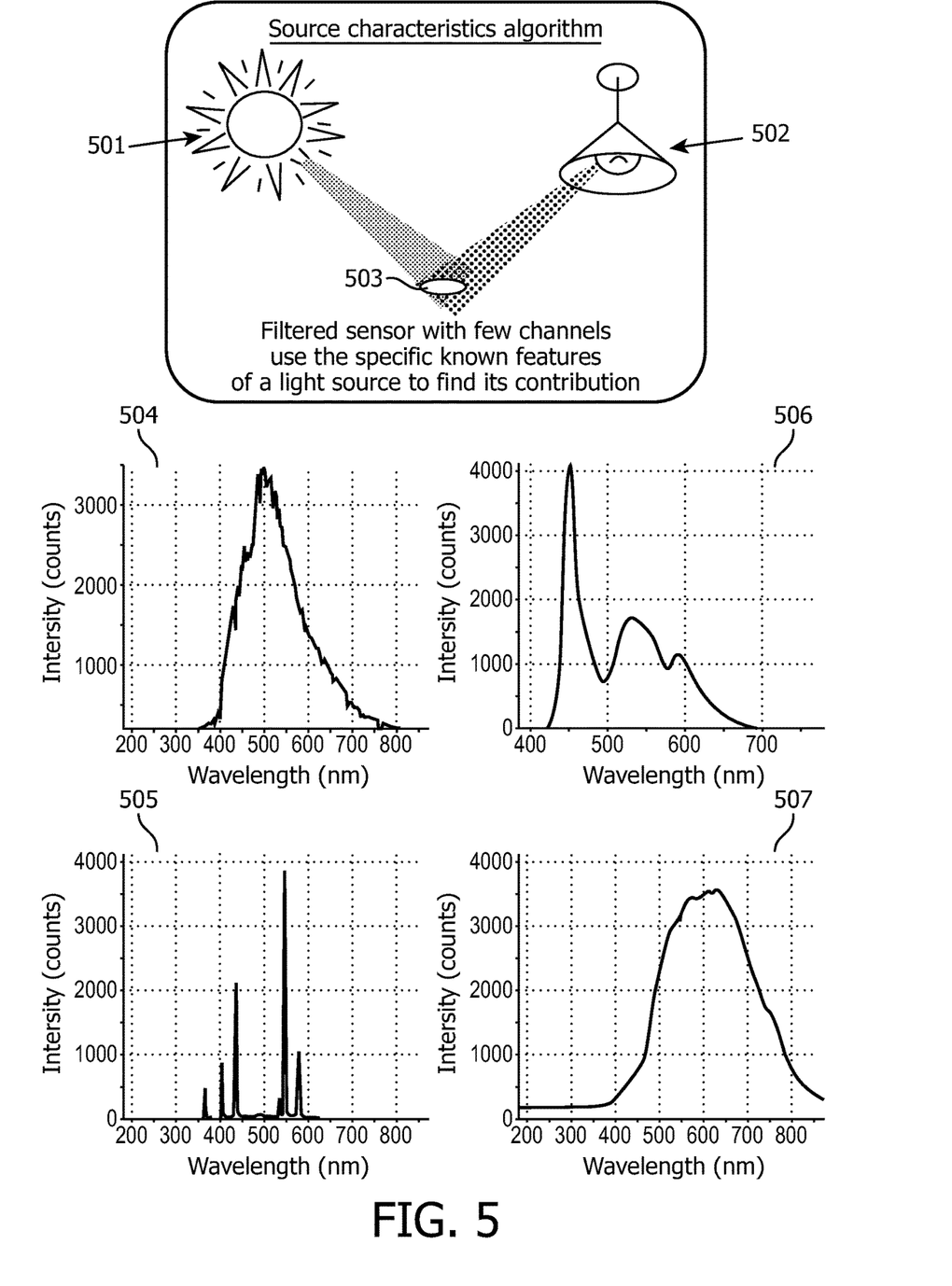
FIG. 5 shows the use of a spectral sensor according to an embodiment of the invention.

1) Spectral Sensor:

As shown in FIG. 5, the spectral sensor 503 discerns the electric light 502 and external light 501 components from the measured spectrum of the light. The spectral sensor 503 uses known characteristics of the electric light and external light to identify their respective lighting intensities. The identification can be implemented using spectral-tuned filters and photodiodes. In FIGS. 5, 504 and 506 are examples of light spectrum of some external light and electric light sources, and 505 and 507 are example characteristics of the spectral filters.

2) Coded Light Sensor

Figure 6:
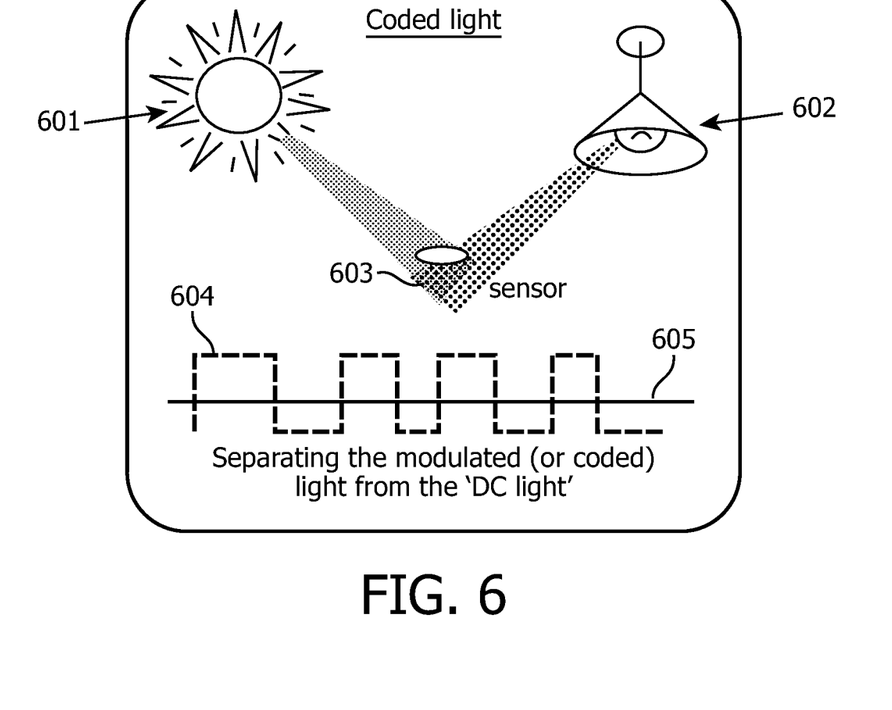
FIG. 6 shows the use of coded light according to an embodiment of the invention.

With this sensing scheme, the electric light 602 of FIG. 6 transmits coded information 604 overlaid on the general lighting 605. The sensing scheme extracts the strength of the coded light signal, estimates the electric light intensity and the external light 601 component from this signal strength and the total light measurement by the sensor 603.

3) Dual Photo Sensors

Figure 7:
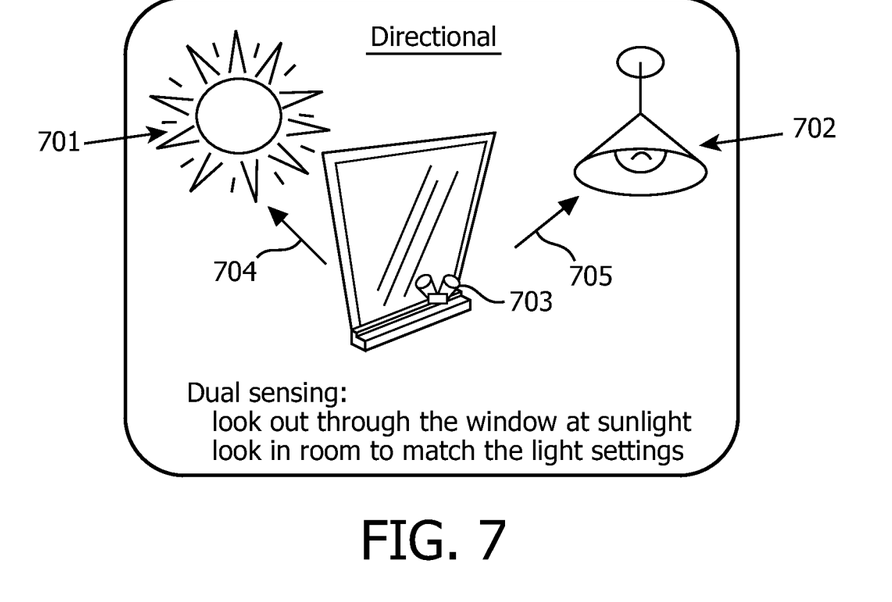
FIG. 7 shows the use of a directional dual sensor according to an embodiment of the invention.

This method utilizes dual photo sensors 703 of FIG. 7 at a window, one looking into the external light source direction 704, where the external light (e.g., sunlight) 701 is outside the window, and another into the electric light direction 705, where the electric light 702 is inside.

4) Model-Based

Another option is estimation of the external light component from the total light measured in the space, transmission characteristics of the window treatments and the available external light (e.g., via external sensor). This requires estimating the amount of external light on the workplane that passed through the window treatments. Knowledge of the transmission characteristics (model) of the window treatments and the position of the sensor relative to the window will be needed.

This invention is applicable to lighting (electric lighting and daylighting) controls and energy management in buildings and homes.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method of controlling light luminosity in a space including an installed light source and an external light source, comprising:
    measuring, using a first controller, individual light intensity components from the installed light source at a location within the space;
    measuring, using a second controller, individual light intensity components from the external light source at the location within the space;
    controlling automatically an intensity level of the installed light source and an amount of light from the external light source entering the space by using the first controller and the second controller, respectively, wherein the controlling of the intensity level is based on the measured light intensity components; and
    tuning automatically the intensity level of the installed light source and the amount of external light entering the space simultaneously by using the first controller and the second controller, respectively, in order to optimize a combined light intensity measured from said light sources as close to a pre-defined target luminance level at said location and minimize an amount of energy consumed by the installed light source, the first controller and the second controller being configured to execute independently and in parallel;
    wherein the tuning is performed by iteratively adjusting the intensity of the installed light source by a first adaptation step size and the amount of external light entering the space by a second adaptation step size, wherein the first and second adaptation step sizes depend on a difference between the pre-defined target luminance level and the combined light intensity measured, and on an energy consumption.

2. The method according to claim 1, wherein the measuring comprises:
    identifying individual light intensity components based on known spectral characteristics of said light sources.

3. The method according to claim 1, wherein the measuring comprises:
    transmitting coded information overlaid on general lighting of the installed light source, and
    extracting a strength of a coded light signal.

4. The method according to claim 1, wherein the measuring comprises:
    measuring individual light intensities from a direction of the installed light source and the external light source by using the first controller and the second controller, respectively.

5. The method according to claim 1, wherein the measuring comprises:
    measuring, using the second controller, an amount of external light available for entering the space; and
    estimating, using the second controller, an external light component at the location based on transmission characteristics of a window through which light from the external light source enters and an amount of available external light.

6. The method according to claim 1, wherein optimizing the combined light intensity measured from said light sources as close to a pre-defined target luminance level at said location takes priority over minimizing the amount of energy consumed by the installed light source.

7. The method according to claim 6, wherein the tuning is performed by iteratively adjusting, using the first controller, the intensity of the installed light source by a first adaptation step size and an amount of external light entering the space by a second adaptation step size, wherein the first adaptation step size depends on a difference between the pre-defined target luminance level and the combined light intensity measured, and the second adaptation step size depends on a difference between the pre-defined target luminance level and the combined light intensity measured, and on an energy consumption.

8. A system for controlling light luminosity in a space including an installed light source and an external light source, comprising:
    a sensor for measuring individual light intensity components from the installed light source and the external light source, respectively, at a location within the space,
    a first controller for automatically controlling an intensity level of the installed light source and a second controller for automatically controlling an amount of light from the external light source entering the space based on the measured light intensities, wherein the first controller and the second controller are each adapted to automatically tune the intensity level of the installed light source and the amount of external light entering the space simultaneously to optimize a combined light intensity measured from said light sources as close to a pre-defined target luminance level at said location and minimize an amount of energy consumed by the installed light source, the first controller and the second controller being configured to concurrently execute independently and in parallel;

wherein the first controller is adapted to iteratively adjust the intensity of the installed light source by a first adaptation step size and the second controller is adapted to adjust the amount of external light entering the space by a second adaptation step size, wherein the first and second adaptation step sizes depend on a difference between the pre-defined target luminance level and the combined light intensity measured, and on an energy consumption.

9. The system according to claim 8, wherein the sensor is a spectral sensor adapted to identify individual light intensity components based on known spectral characteristics of said light sources.

10. The system according to claim 8, wherein the installed light source is adapted to transmit coded information overlaid on general lighting of the installed light source, and the sensor is adapted to extract a strength of a coded light signal.

11. The system according to claim 8, wherein the sensor comprises dual photo sensors, one looking into an installed light source direction and another looking into an external light source direction.

12. The system according to claim 8, further comprising a sensor for measuring the amount of external light available for entering the space, and wherein the external light component at the location is estimated based on transmission characteristics of a window through which light from the external light source enters and an amount of available external light.

13. A non-transitory computer readable medium having stored thereon instructions for causing a first processor and a second processor to perform a process of controlling light luminosity in a space including an installed light source and an external light source, the process comprising:

measuring, using a first processor, individual light intensity components from the installed light source and the external light source, respectively, at a location within the space;

measuring, using a second controller, individual light intensity components from the external light source;

controlling automatically an intensity level of the installed light source and an amount of light from the external light source entering the space by using the first processor and the second processor, respectively, based on the measured light intensities; and tuning automatically the intensity level of the installed light source and the amount of external light entering the space simultaneously by using the first processor and the second processor, respectively, to optimize a combined light intensity measured from said light sources as close to a pre-defined target luminance level at said location and minimize an amount of energy consumed by the installed light source, the first controller and the second controller being configured to execute independently and in parallel;

wherein the tuning is performed by iteratively adjusting the intensity of the installed light source by a first adaptation step size and the amount of external light entering the space by a second adaptation step size, wherein the first and second adaptation step sizes depend on a difference between the pre-defined target luminance level and the combined light intensity measured, and on an energy consumption.

* * * * *